United States Patent [19]

Degoix et al.

[11] Patent Number: 4,537,468
[45] Date of Patent: Aug. 27, 1985

[54] REINFORCED OPTICAL FIBER BUTT WELD CONNECTION

[75] Inventors: Bernard Degoix; Daniel Boussemaer, both of Calais; Didier Allemand, Marck, all of France

[73] Assignee: Les Cables de Lyon, France

[21] Appl. No.: 435,592

[22] Filed: Oct. 20, 1982

[30] Foreign Application Priority Data

Oct. 28, 1981 [FR] France .................. 81 20212

[51] Int. Cl.³ .............................................. G02B 5/14
[52] U.S. Cl. .................................................. 350/96.21
[58] Field of Search ............... 350/96.20, 96.21, 96.22

[56] References Cited

U.S. PATENT DOCUMENTS

| 2,895,950 | 7/1959 | Krieble | 260/89.5 |
| 3,041,322 | 6/1962 | Krieble | 260/89.5 |
| 3,043,820 | 7/1962 | Krieble | 260/89.5 |
| 3,046,262 | 7/1962 | Krieble | 260/89.5 |
| 3,218,305 | 11/1965 | Krieble | 260/89.5 |
| 3,904,269 | 9/1975 | Lebduska et al. | 350/96 C |
| 4,196,965 | 4/1980 | Matsuno | 350/96.21 |

FOREIGN PATENT DOCUMENTS 75140 5/1976 Australia .

OTHER PUBLICATIONS

Japanese Laid Open Patent No. 54/477767 of Apr. 14, 1979, Translation of Pertinent Portions Thereof.
Dakss, *Splicing Optical Fibers;* Laser Focus, May 1978, pp. 66-70.
Cagle, Handbook of Adhesive Bonding; Jun. 6, 1973, pp. 6-21.
Skeist, Handbook of Adhesives; Oct. 10, 1972; p. 561.

*Primary Examiner*—William L. Sikes
*Assistant Examiner*—Robert E. Wise
*Attorney, Agent, or Firm*—Sughrue, Mion, Zinn, Macpeak, and Seas

[57] ABSTRACT

A device for reinforcing the butt weld (5) of two optical fibres (1,2) in a telecommunications cable. The ends of the fibres are stripped. Said device comprises a metal capillary tube (6) which extends on either side of these ends along some length of the sheaths of the fibres. The capillary tube is made of a metal of high mechanical strength and surrounds the sheaths with little clearance. The remaining space (7,8) between the capillary tube and the stripped ends of the fibres and between the capillary tube and the sheaths of the fibres is filled with a slow-setting adhesive which is very fluid when in the liquid state and which sets in the absence of air.

5 Claims, 1 Drawing Figure

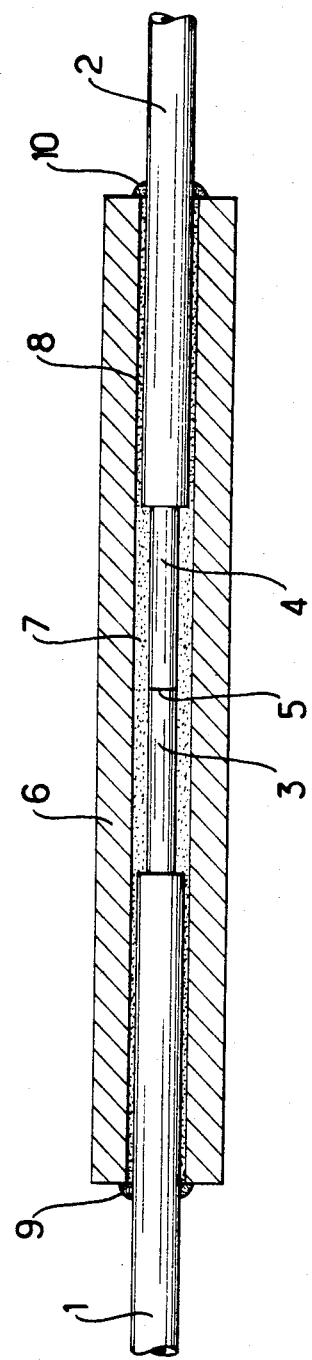

REINFORCED OPTICAL FIBER BUTT WELD CONNECTION

The present invention relates to a reinforced butt weld connection between the ends of two optical fibres. The fibre ends are stripped of a mechanical protection sheath, and said device comprises a capillary made of a metal of high mechanical strength which surrounds the weld and extends over the sheaths of the optical fibre on either side of the weld. There is little clearance between the tube and the sheaths.

BACKGROUND OF THE INVENTION

It is know that the mechanical characteristics of the optical fibres on either side of a weld, in particular their breaking elongation are about 20 times smaller than the same characteristics of the original fibre. Due to this fact, when an optical fibre is subjected to traction, the weld zones constitute its weakest parts and when breakage occurs, it occurs at the weld zones.

In the document "A 34-Mbit/s optical field trial system" by E. Adler, H. Haupt and W. Zschunke, read in Geneva at the 4th European Conference on optical communication, held on 12th to 15th Sept., 1978, a proposal was made to reinforce optical fibre weld zones by means of a malleable metal tube of low modulus of elasticity crimped onto the fibre sheaths on either side of the stripped ends. The mechanical properties of a weld zone are thereby improved to some extent but they remain much lower then those of the original fibre.

Also, French patent specification No. 2380559 (equivalent to U.S. Pat. No. 4196965), describes a device for reinforcing the butt weld between two optical fibres whose cladding, of lower refractive index then that of the fibre core is removed in the zone on either side of the butt weld. In said zone, the optical fibres are surrounded by a sleeve consisting of two layers—an inner layer made of fluorinated or silicone resin and whose refractive index is lower than that of the fibre core; and a metal outer layer. The space between the sleeve and the fibre core is optionally filled with a resin of lower refractive index than the fibre core. The sleeve can then have a single metal layer. However, optical cladding made of thermoplastic material which is easy to separate from the fibre core provides a lower quality of fibre from the light transmission point of view and a cladding made of silica or of glass which is difficult to separate from the fibre core. Further, replacing the optical cladding by a sleeve—even a sleeve which has an inner layer made of resin whose refractive index is lower than that of the fibre core—can cause discontinuity in the transmission of the light-radiation at the interface between the optical cladding and the sleeve.

Preferred embodiments of the present invention provide a reinforced connection which imparts to a weld zone mechanical properties (in particular tensile strength and elongation on traction) which are close to those of the original optical fibre, so that said weld zone is not systematically the seat of possible breakage. The reinforced connection is generally easy to prepare and does not give rise to discontinuity in the transmission of light-radiation.

SUMMARY OF THE INVENTION

The present invention provides a reinforced butt weld connection between the ends of two optical fibres, said fibres having a protective sheath over most of their length and having an end portion stripped of said sheath, said connection comprising a capillary tube made of a metal of high mechanical strength, said tube surrounding the butt weld and adjacent portions of optical fibre and extending over a non-stripped portion of each of said fibres, said tube having a bore which leaves little clearance around sheaths of the optical fibres, wherein the space between the capillary tube and the stripped ends of the fibres and between the capillary tube and the sheaths of the fibres is filled with a slow-setting adhesive which is very fluid in the liquid state and which hardens in the absence of air.

The connection also preferably includes at least one of the following features:
the slow-setting adhesive is an acrylic polydiester.
A drop of fast-setting adhesive is included at each end of the capillary tube.
The metal of the capillary tube is a stainless steel with a high modulus of elasticity.
The thickness of the tube is about one fourth of its outside diameter.

BRIEF DESCRIPTION OF THE DRAWING

A reinforced butt weld connection between the ends of two optical fibres in a telecommunications cable is described hereinafter by way of example and with reference to the sole FIGURE of the accompanying drawing, which is a longitudinal section through the ends of two optical fibres which are butt welded together and which are reinforced by said device.

MORE DETAILED DESCRIPTION

In the FIGURE, the two sheathed optical fibres 1 and 2 of diameter slightly smaller than 0.25 mm are stripped at their ends 3 and 4 over to a distance of about 20 mm on either side of a butt weld 5 joining their ends together. The weld has been treated by immersion in hydrofluoric acid at a concentration of about 48% by weight. The fibres are surrounded by a capillary tube 6 made of stainless steel with a high modulus of elasticity, e.g. about 15,000, a length of 100 mm, an outside diameter of 0.6 mm and a thickness of 0.15 mm. The space 7 which remains between the stripped fibres and the surrounding capillary tube and the spaces 8 between the sheaths of the fibres and the capillary tube are filled with an adhesive having a long setting time (e.g. 6 days). The adhesive is one which sets in the absence of air, e.g.; an acrylic polydiester which, due to its fluidity, enters by capillarity and fills the entire volume between the fibres and the internal surface of the capillary tube. Since said adhesive takes several days to set, the ends of the fibres are held motionless in place where they leave the ends of the tube 6 by respective drops 9 and 10 of a fast-setting adhesive such as a poly-cyanoacrylate. This makes it possible to manipulate the connection almost immediately without thereby subjecting it to traction stresses.

Due to the fact that the slow setting adhesive wets silica and stainless steel very well and completely fills the entire length of the volume which remains between the fibres and the inside surface of the capillary tube traction forces applied to the fibres are completely transmitted to the capillary tube. The mechanical properties of the tube are such that when it is subjected to the breaking stress of non welded fibre, it does not increase in length by a value greater than that which the welded non-reinforced optical fibre can accept. Thus, for the weld zone, the tensile strength obtained is identical to that of the non-welded sheathed optical fibre, i.e. about 4 to 6 daN for a silica fibre.

Although the reinforced butt welded connection between two optical fibres which has just been described with reference to the FIGURE of the drawing appears to be the preferred embodiment of the invention, it will be understood that various modifications can be made thereto without thereby going beyond the scope of the invention. In particular, an adhesive which sets more rapidly can be used inside the capillary tube if it is required to have a connection which is up to final strength more quickly. Stainless steel could be replaced by another metal of comparable mechanical strength, and a tube of smaller diameter could be used.

We claim:

1. A reinforced butt weld connection between the ends of two optical fibres, said fibres having a protective sheath over most of their length and having an end portion stripped of said sheath, said connection comprising a capillary tube made of a metal of high mechanical strength, said tube surrounding a butt weld between said fibre ends and adjacent stripped portions of optical fibre and extending over a non-stripped portion of each of said fibres, said tube having a bore which leaves little clearance around the sheaths of the optical fibres and a slow-setting adhesive which is very fluid in the liquid state and which hardens in the absence of air filling the space between the capillary tube and the stripped ends of the fibres and between the capillary tube and the sheaths of the fibres by capillarity to the extent of the entire volume of said space between the fibres and the internal surface of the capillary tube with the slow-setting adhesive completely wetting the surfaces of the optical fibres and the tube with which it contacts to facilitate complete transmission of the traction forces applied to the fibres to the capillary tube.

2. A connection according to claim 1, wherein the slow-setting adhesive is an acrylic poly-diester.

3. A connection according to claim 1, further including a drop of a very fast-setting adhesive at each end of the capillary tube surrounding said fibers and sealing the ends of said slow-setting adhesive filled clearance to facilitate the manipulation of the connection substantially immediately without subjecting the connection to traction stresses.

4. A connection according to claim 1, wherein the metal of the capillary tube is a stainless steel with a high modulus of elasticity.

5. A connection according to claim 1, wherein the thickness of the tube is about one fourth of its outside diameter.

* * * * *